Patented Jan. 18, 1944

2,339,419

UNITED STATES PATENT OFFICE 2,339,419

METHOD OF MAKING PUFFED CEREAL FLAKES

Eugene H. McKay, Battle Creek, Mich., assignor to National Biscuit Company, New York, N. Y., a corporation of New Jersey No Drawing. Application July 2, 1941, Serial No. 400,796

4 Claims. (Cl. 99—81)

My invention pertains to puffed cereal flakes and a method of making same.

Puffed cereal flakes have long been known but a commercially feasible process of making them has not been available until the present invention. Prior proposed processes have not been satisfactory because they were so slow or expensive to carry out that the product could not compete in price with the usual thin flakes, or they failed to produce puffed flakes that were superior to or had any advantages over other cereals with which they had to compete.

By means of the present invention I produce puffed flakes which are not only superior in flavor, crispness, resistance to absorption of moisture and keeping qualities but also can successfully compete on a price basis with other prepared cereals.

Cereal flakes produced by my process are puffed hollow flakes, generally oval in cross-section, with a somewhat glossy exterior or coat that is protective against absorption of moisture so that the flakes retain their crispness not only during humid weather but also when being eaten with milk or cream. Ordinary thin cereal flakes, because of their large surface exposure and lack of protective coating, absorb atmospheric moisture readily and become tough and limp during the summer months when the relative humidity is high. Puffed flakes, according to my invention, expose a minimum of surface and this, together with their glossy coating, minimizes the absorption of moisture and insures their crispness under all climatic conditions.

According to my process, I may use corn flour, rice flour, wheat flour, or other starches, or a mixture thereof, as the basic or major ingredient, using corn flour for the production of corn flakes; rice flour for rice flakes; and similarly for other kinds of cereal flakes. I will describe my invention with respect to the production of puffed corn flakes.

In producing corn flakes, I have found the following formula to give good results, but of course the percentages of the ingredients may be varied within considerable limits, and other flavoring ingredients may be added or substituted in whole or in part for those stated:

| | Pounds |
|---|---|
| White corn flour | 100 |
| Sugar (sucrose) | 12 |
| Malt extract | 4 |
| Salt | 2½ |
| Water | 80 |

The ingredients may be mixed in any order but I prefer to make a solution of the sugar, malt and salt in the water and then add the flour and mix until uniform. This makes a relatively soft dough which I then cook, preferably in a steam pressure cooker, until it forms a dense, stretchy, flexible mass, caramel-like in appearance, which may vary in color from light tan to brown, depending upon the temperature and time of cooking, the mass becoming darker with longer cooking. The cooking may be accomplished in "batches" or by a continuous process, and is continued long enough so that the starch is sufficiently dextrinized and the sucrose, at least in part, inverted and caramelized to produce a brownish colored mass that is rubber-like in consistency.

This mass is then separated by cutting or breaking into small pieces of about one inch or smaller and dried in a current of air, which may be at room temperature, until the pieces separate freely or lose their stickiness sufficiently so that they can be handled.

I next work or knead these pieces until they become light buff or nearly white in color. This kneading may be accomplished in any manner that will thoroughly break up and inter-mix the cooked masses, as by repeated rolling or sheeting, but I have found that it can be best controlled when accomplished by extruding the masses or pieces in strings, as through an extruding machine having a perforated outlet plate through which the cooked mass is ejected in multiple strings. I prefer to use a machine which produces strings of about $\frac{1}{8}$ inch diameter. The material may be extruded as many times as desired, it becoming lighter in color with each extrusion. As the material is extruded, air is blown over it, and continued until the surface of the strings lose their "tackiness". They are then re-extruded and again surface dried until the desired color and consistency are obtained. Usually two or three extrusions are sufficient.

After final extrusion and drying, I cut the strings into short pieces, from ⅜ to ⅝ inch in length, and again surface dry the pellets with an air current until they are of uniform texture within a relatively non-sticky film or skin.

The pellets are then rolled into flakes from ¼₄ to ⅛ inch in thickness. During rolling the skin-like surface of the pellets seems to stretch so that the two sides of the flake are covered by thin films which are bound together at the edges where the material dries during the interval between rolling and feeding into the oven. Usually the freshly rolled flakes will drop onto a conveyor which carries them continuously into a puffing and toasting oven. The time of the flakes on this conveyor is long enough for the edges to dry somewhat. Preferably, I use an inclined rotary oven, which is divided by a baffle into a puffing zone, which is at the upper or entrant end of the oven, and a toasting zone, which occupies about the lower two thirds of the oven. The temperature of the oven is slightly higher at the toasting end than at the puffing end, and I have found a toasting temperature of 285 to 300 degrees F. to give satisfactory results for a four-minute puffing and toasting time for corn flakes. But, of course this temperature will vary with the moisture content, the ingredients used, degree of toasting desired, and other factors.

The flakes puff into globular form almost immediately upon entering the oven and usually before they reach the sides or bottom of the oven. During puffing, the films or skin-like surfaces of the flakes separate and stretch somewhat like a small rubber balloon when it is inflated. The films are held together around the edges due to the short drying of the flakes which forms a tight seal and prevents air from entering into the finished product. They then pass past the baffle into the toasting zone and emerge from the oven as bright golden brown hollow shells or flakes.

These flakes generally exhibit a smooth shiny surface, that seems to be formed at least in part from toasted or caramelized dextrose, sucrose, fructose or other saccharides that were present in the mix or resulted from the cooking process and in part may be attributed to the kneading or multiple extrusions. With each extrusion the material becomes smoother and finer grained as well as lighter in color. This eliminates the porosity of the skin on the rolled flakes so that the skin on the two sides will be bound together at the edges but will separate inside the edges to form globular flakes or bodies when subjected to oven heat. This fine grained skin produces a smooth surface, as contrasted with the porous surface of ordinary cereal flakes and puffed whole cereals. This surface is resistant to absorption of and penetration by moisture and is a material factor in retaining crispness in the flakes. Furthermore, the hollow flakes, being exposed only on the exterior, present much less surface to the atmosphere per unit weight of flakes than do the usual thin flat flakes.

My process lends itself to continuous production, and attains its greatest efficiency when so utilized.

The step of cooking the mixture is generally the longest step in the process, a cooking time of 1½ to 2 hours being required for the stated formula when conducted at the temperature corresponding to 15 pounds steam pressure in the cooker. This cooking must be continued until the mass acquires the desired color, probably due to caramelization of some of the saccharides, and the desired stiffness or consistency. This cooking time may be shortened by increasing the temperature and pressure, or by the addition of small amounts of ingredients such as citric acid, acid salts, alkaline salts and the like which alter the pH of the mix or accelerate the dextrinization of the starch, inversion of the sugar and caramelization.

After being cooked to the desired color and consistency, the cooked caramel-like mass is delivered to a breaking and cooling device which may be a perforated or open-mesh belt through which cool air is blown as the mass is broken or cut into small pieces thereon. The breaking and cooling is continued usually for about ten minutes, and the belt, if used, is of such length and moves at such speed as to permit proper cooling.

After being broken up and cooled, the broken or cut pieces are delivered to the hopper of an extrusion machine from which the product is extruded in a number of strings of about $\frac{3}{16}$ inch diameter. These strings are delivered to a cooling device, which may be an open mesh belt through which cool air is blown to surface dry the strings. This drying usually continues for about ten minutes.

The strings are then delivered to a second similar extrusion machine from which they are again extruded in strings of the same size. These strings become lighter in color with each extrusion, and successive extrusions will follow until the desired light color is attained, usually two or three. After each extrusion the strings are surface dried by a current of cool air for about ten minutes. Each cooling reduces the moisture content to some extent.

After the final extrusion, the strings are fed to a cutter which cuts them into short cylindrical pellets of ⅜ to ⅝ inch length.

These pellets fall from the cutter to another perforated belt through which air is blown to further dry them.

The pellets are then fed to flaking rolls where they are rolled into flakes, which may be from 1/64 to 1/16 inch thick. The thickness being determined by the thickness desired in the finished product and the puffing characteristics of the formula being used.

From the flaking rolls, the flakes are fed to the oven where they are puffed and toasted.

The toasted flakes are then cooled and ready for packing.

The dough in the initial raw stage contains about 80% moisture and this is reduced in the successive stages until the flakes before puffing contain from 25 to 30%, within which limits the best puffing into hollow shells or flakes usually results. However, this is not a limitation on the invention because the flakes under controlled conditions will puff when containing as little as 20% moisture.

Having thus described my invention and one process and formula for carrying it out, what I claim is:

1. The process of forming a puffed cereal flake which comprises forming a soft dough from a mixture of cereal flour, sugar, malt and water, cooking the mixture until it forms a brown flexible mass, cooling and separating the cooked mass to form small pieces, kneading the pieces until they become light in color, surface drying the kneaded product, forming the light colored product into flakes, puffing the flakes by heat to form hollow bodies, and toasting the puffed flakes.

2. The process of forming a puffed cereal flake which comprises forming a soft dough from a mixture of cereal flour, sugar, malt and water, cooking the mixture under steam pressure until it forms a brown mass, cooling and separating the mass into small pieces, repeatedly extruding the cooled pieces in strings until they have became light in color, surface drying the strings after each extrusion, cutting the strings after the last extrusion into small pellets, surface drying the pellets, forming the pellets into flakes, puffing the flakes by heat to form hollow bodies, and toasting the puffed flakes.

3. The process of forming puffed cereal flakes which comprises forming a dough from a mixture of cereal flour, sugar, malt and water, cooking the mixture under steam pressure until the flour is dextrinized sufficiently and the sugar caramelized sufficiently to form a brown flexible mass, cooling the cooked mass, repeatedly extruding the cooled mass in strings until they lose their brown color and become light, surface drying the strings after each extrusion, cutting the strings after the last extrusion into small pellets, surface drying the pellets, rolling the pellets into flakes, puffing the flakes by heat to form hollow bodies, and toasting the puffed flakes.

4. The process of forming a puffed cereal flake which comprises forming a dough from a mixture of cereal flour, flavoring material and water, cooking the dough until it forms a brown flexible mass, cooling and breaking the mass into small pieces, repeatedly extruding the pieces until they become light in color, cutting the strings after the last extrusion into small pellets, surface drying the pellets to provide a skin thereon, rolling the pellets into flakes with the skin of the pellets forming a skin on each side of the flakes, drying the flakes until the skins on the two sides are joined at the edges, puffing the flakes by heat to form hollow bodies covered by the skins, and toasting the hollow bodies.

EUGENE H. McKAY.